United States Patent [19]

Harmsen

[11] 4,201,327

[45] May 6, 1980

[54] METHOD OF PRODUCING A LAMINAR CONTACT MATERIAL INCLUDING A LAYER OF SILVER AND A METAL OXIDE DISPERSED THEREIN

[75] Inventor: Ulf O. Harmsen, Pforzheim, Fed. Rep. of Germany

[73] Assignee: Dr. Eugen Dürrwächter Doduco, Pforzheim, Fed. Rep. of Germany

[21] Appl. No.: 911,708

[22] Filed: Jun. 1, 1978

[30] Foreign Application Priority Data

Jun. 4, 1977 [DE] Fed. Rep. of Germany ....... 2725328

[51] Int. Cl.² .......................... B23K 31/02; H01R 9/04
[52] U.S. Cl. .................................... 228/176; 29/527.7
[58] Field of Search ....................... 228/176, 158, 263; 29/630 C, 527.5, 527.6, 527.7

[56] References Cited

U.S. PATENT DOCUMENTS

| | | | |
|---|---|---|---|
| 3,545,067 | 12/1970 | Haarbye et al. | 29/630 C |
| 3,802,062 | 4/1974 | Harmsen et al. | 29/630 C X |
| 3,821,848 | 7/1974 | Backstrom | 29/630 C |
| 3,880,608 | 4/1975 | Haarbye | 228/263 X |
| 3,971,123 | 7/1976 | Olsson | 29/527.7 |

FOREIGN PATENT DOCUMENTS

2054861  6/1972  Fed. Rep. of Germany .

*Primary Examiner*—Ervin M. Combs
*Assistant Examiner*—K. J. Ramsey
*Attorney, Agent, or Firm*—Toren, McGeady and Stanger

[57] ABSTRACT

A laminar contact material having one layer of silver or a non-oxidizable silver alloy and another layer of silver intimately mixed with an oxide of cadmium and/or other oxidizable metal is made by cladding the non-oxidizable layer with a silver alloy of the oxidizable metal in the "as cast" condition by continuous hot rolling, and thereafter exposing the compound material at elevated temperature to an atmosphere rich in oxygen.

6 Claims, No Drawings

METHOD OF PRODUCING A LAMINAR CONTACT MATERIAL INCLUDING A LAYER OF SILVER AND A METAL OXIDE DISPERSED THEREIN

BACKGROUND OF THE INVENTION

1. Field of the Invention

This invention relates to a method of manufacturing a solderable laminar contact material having a layer of silver or non-oxidizable silver alloy and a cladding of silver in which an oxide of cadmium, and/or another oxidizable metal is substantially uniformly dispersed.

2. Description of the Prior Art

It is known from German Pat. No. 2,054,861 to produce a laminar contact material having a top layer of silver and cadmium oxide by cladding a base of silver or non-oxidizable silver alloy with a superimposed layer of silver-cadmium alloy by hot rolling, and by thereafter converting the cadmium in the top layer of cadmium oxide in an oxygen bearing atmosphere at elevated temperature. It is a disadvantage of the known process that the silver-cadmium alloy tends to oxidize while being heated to rolling temperature so that the interface is enriched with cadmium oxide, and that the bond between the two layers is weakened thereby.

It has been attempted to overcome this difficulty by bonding the two layers to each other at lower temperature and higher pressure, but is has been found that the bonding zone so produced contains voids into which cadmium migrates during the subsequent oxidation procedure. The interface between the two layers is enriched with cadmium oxide and the results are not significantly better than by conventional hot rolling.

It has further been proposed to superimpose a cold plate of silver-cadmium alloy on a plate of silver preheated to 200° to 950° C., to compress the two layers at 500 to 5000 kg/cm², and to expose the resulting compound product to oxidizing conditions. A strong bond is achieved in this manner, but the process is inherently limited to batch operation and relatively costly.

SUMMARY OF THE INVENTION

It is a primary object of this invention to provide a method for producing a laminar contact material having a base layer of silver or of a silver alloy at least approximately as resistant to atmospheric oxidation as silver, and a top layer consisting essentially of silver and of an oxide of cadmium and/or of other oxidizable metal which combines the economic advantages of continuous hot rolling with the good bond between the two layers available heretofore only by other manufacturing steps.

It has been found that a strong bond can be produced by hot rolling between a base layer of silver or a similarly oxidation resistant silver alloy and a top layer consisting essentially of silver and minor alloying amounts of the oxidizable metal, if the top layer is prepared by casting, preferably continuous casting or extrusion, and is superimposed on the oxidation resistant base layer in the "as cast" condition, as determined by metallographic inspection and the two layers then are subjected to joint hot rolling. Neither blisters nor other defects are found at the interface of the two layers after rolling, and a strong bond is formed even if the oxidation alloy is superficially oxidized prior to rolling.

DESCRIPTION OF THE PREFERRED EMBODIMENTS

The oxidizable alloy constituent having greatest economic significance at this time is cadmium, and the advantages of silver-cadmium oxide contacts in electrical machinery are well known. However, laminar material including oxides of antimony, bismuth, copper, magnesium, tin, indium, and zinc are prepared in the same manner and show the same superior bond strength. Some of these metals have been used successfully for replacing all or some of the poisonous cadmium in laminar contact materials.

The hot rolling temperature necessary for a good bond may be selected between 200° and 800° C. with corresponding roll pressures. Best results are generally obtained at rolling temperatures and pressures which cause a reduction of 30% to 70% in the combined cross sectional area of the superimposed layers at right angles to the direction of rolling. A rolling temperature of approximately 400° C. has been found to produce best bonds with silver-cadmium alloys, particularly those containing 10±2% cadmium.

The operating conditions for internal oxidation of the oxidizable metal are not critical. Temperatures of 600° to 850° C. at partial oxygen pressures between approximately 15 and 75 p.s.i.g. are generally effective, and the afore-mentioned silver-cadmium alloys are readily oxidized at about 800° C. and an oxygen pressure of approximately 30 p.s.i.g.

The following Example is further illustrative of this invention.

EXAMPLE

A molten mixture of 91% silver and 9% cadmium was cast continuously from a die in a width of 160 mm and a thickness of 30 mm. A two-meter length of the alloy was heated in an oxidizing atmosphere to convert the cadmium to the oxide to a depth of about 0.5 mm and then superimposed on a silver strip 11 mm thick and of the same length and width as the alloy strip. The superimposed layers were rolled at approximately 400° C. at a roll pressure sufficient to reduce the combined cross section by approximately 50%, and the compound material so obtained was held at 800° C. in an atmosphere of technically pure oxygen at 30 p.s.i.g until microscopic examination showed complete internal oxidation of the cadmium. The silver layer was readily soldered, and the Ag-CdO layer was firmly bonded to the silver base and performed well in motor starter contacts.

Equally favorable results were obtained with a silver alloy containing 10.4% cadmium, and firmly bonded laminar materials containing more and less cadmium were readily produced in an analogous manner. Only minor changes in bond strength were observed at reduction rates as low as 30% or as high as 70%, and acceptable bonds were produced by hot rolling at 200° or 800° C. A silver thickness of only 2 mm or 2 mm, and a thickness of the cast silver-cadmium alloy between 10 and 50 mm did not materially affect the results.

Compound materials containing the other oxidizable metals enumerated above were prepared in substantially the same manner and were distinguished by similarly high bond strength.

It should be understood, therefore, that the foregoing disclosure relates only to a preferred embodiment, and that it is intended to cover all changes and modifications of the example of the invention herein chosen for the purpose of the disclosure which do not constitute departures from the spirit and scope of the invention set forth in the appended claims.

What is claimed is:

1. In a method of producing a laminar, solderable contact material in which a first layer of silver or of an alloy of silver not substantially less resistant to atmospheric oxidation than silver is clad by hot rolling with a second layer or an alloy of silver with an oxidizable metal, and the compound material so obtained is exposed to an oxygen-bearing atmosphere at elevated temperature until said metal is converted to the oxide, the improvement which comprises said second layer being a casting in the metallographic as-cast condition and being produced prior to said hot rolling by continuous casting.

2. In a method as set forth in claim 1, said oxidizable material being cadmium, zinc, indium, or tin.

3. In a method as set forth in claim 2, said first layer being clad with said second layer by rolling at a temperature of 200° to 800° C. and a pressure sufficient to reduce the combined cross sectional area of said layers perpendicular to the direction of rolling by 30% to 70%, said elevated temperature being between 600° and 850° C., and the oxygen pressure in said atmosphere being between approximately 15 and 75 p.s.i.g.

4. In a method as set forth in claim 3, the surface of said second layer being oxidized prior to said hot rolling until the oxidizable metal content thereof is converted to the corresponding oxide to a depth of approximately 0.5 mm.

5. In a method as set forth in claim 3, said oxidizable metal being cadmium, and the temperature of said layers during said rolling being approximately 400° C.

6. In a method as set forth in claim 5, said elevated temperature being approximately 800° C., and said oxygen pressure being approximately 30 p.s.i.g.

* * * * *